US010983759B1

(12) United States Patent
Kumar et al.

(10) Patent No.: US 10,983,759 B1
(45) Date of Patent: Apr. 20, 2021

(54) RAPID API DEVELOPMENT

(71) Applicant: BANK OF AMERICA CORPORATION, Charlotte, NC (US)

(72) Inventors: Manoj Kumar, Hopewell, NJ (US); Dheeraj K. Palakurthy, Waxhaw, NC (US)

(73) Assignee: BANK OF AMERICA CORPORATION, Charlotte, NC (US)

(*) Notice: Subject to any disclaimer, the term of this patent is extended or adjusted under 35 U.S.C. 154(b) by 16 days.

(21) Appl. No.: 16/696,302

(22) Filed: Nov. 26, 2019

(51) Int. Cl.
| | |
|---|---|
| *G06Q 30/06* | (2012.01) |
| *G06Q 50/00* | (2012.01) |
| *G06Q 20/12* | (2012.01) |
| *G06Q 20/40* | (2012.01) |
| *G06F 8/30* | (2018.01) |
| *H04L 29/06* | (2006.01) |
| *G06F 8/60* | (2018.01) |
| *G06F 3/0484* | (2013.01) |
| *G06F 16/21* | (2019.01) |
| *G06F 3/0482* | (2013.01) |
| *G06F 9/54* | (2006.01) |

(52) U.S. Cl.
CPC .............. *G06F 8/30* (2013.01); *G06F 3/0482* (2013.01); *G06F 3/04847* (2013.01); *G06F 8/60* (2013.01); *G06F 9/547* (2013.01); *G06F 16/21* (2019.01); *H04L 63/083* (2013.01)

(58) Field of Classification Search
CPC ... G06F 8/30; G06F 8/60; G06F 16/21; G06F 3/0482; G06F 3/04847; G06F 30/0625; G06F 30/0633; G06F 30/0635; G06F 30/0641; G06Q 50/01
See application file for complete search history.

(56) References Cited

U.S. PATENT DOCUMENTS

| | | |
|---|---|---|
| 6,493,868 B1 | 12/2002 | DaSilva et al. |
| 7,032,168 B1 | 4/2006 | Gerace et al. |
| 7,543,268 B2 | 6/2009 | Cherdron et al. |
| 8,117,589 B2 | 2/2012 | Christensen et al. |
| 8,255,888 B2 | 8/2012 | Jesse et al. |
| 9,092,575 B2 | 7/2015 | Koenig et al. |
| 9,635,191 B2 * | 4/2017 | Sharma ................. H04M 15/58 |

(Continued)

OTHER PUBLICATIONS

Vukovic et al., API Terms and Conditions as a Service, 8 pages (Year: 2014).*

*Primary Examiner* — Thuy Dao
(74) *Attorney, Agent, or Firm* — Michael A. Springs; Moore & Van Allen PLLC; Nicholas C. Russell (57) ABSTRACT

Embodiments of the invention are directed to systems, methods, and computer program products for automating the development and implementation of API protocols via a user-friendly user interface (UI) dashboard that allows users to create new API protocols without the need for intensive coding. The system is configured to provide automatic data discovery, customized documentation with UI based management, and support for all major database types. The system is designed to provide a seamless front-end creation dashboard which users can use to configure APIs by inputting a limited amount of information. The system includes inbuilt administration features, such as a separate user interface dashboard for system administrators to monitor the creation of and activity associated with active APIs across an entity system.

20 Claims, 9 Drawing Sheets

(56) References Cited

U.S. PATENT DOCUMENTS

| | | | |
|---|---|---|---|
| 9,678,726 | B1 | 6/2017 | Massaguer et al. |
| 9,754,265 | B2 * | 9/2017 | Seelig |
| 9,922,381 | B2 * | 3/2018 | Isaacson ............ G06Q 20/3223 |
| 10,061,578 | B2 | 8/2018 | Walsh et al. |
| 10,379,838 | B1 | 8/2019 | Chud |
| 2003/0163479 | A1 | 8/2003 | Mathews et al. |
| 2005/0071805 | A1 | 3/2005 | Lauterbach et al. |
| 2005/0076327 | A1 | 4/2005 | Helal et al. |
| 2006/0112397 | A1 | 5/2006 | Raghunandan et al. |
| 2007/0169015 | A1 | 7/2007 | Seelig et al. |
| 2008/0134156 | A1 | 6/2008 | Osminer et al. |
| 2010/0037156 | A1 | 2/2010 | Hosoda |
| 2011/0055799 | A1 | 3/2011 | Kaulgud et al. |
| 2014/0047368 | A1 | 2/2014 | Yang et al. |
| 2014/0047409 | A1 | 2/2014 | Yang et al. |
| 2014/0366000 | A1 | 12/2014 | Batabyal et al. |
| 2015/0095923 | A1 | 4/2015 | Sarid |

\* cited by examiner

Create New API — 4061

Api
Uniqueid
Name
Desc
Connection: TEST
Verbid: GET
Typeid: Table
Select DB Object

4062

API

| Name | Verbid | ObjectName | APIResourceKey | APIResourcePath | IsActive | RequestedBy | Connection |
|---|---|---|---|---|---|---|---|
| TEST | GET | NAME | KEY | PATH | TRUE | AD USER X | |

RAPID API DEVELOPMENT

FIELD OF THE INVENTION

The present invention generally relates to a set of functions and procedures allowing the creation of applications that access the features or data of an operating system, application, or other service across one or more entity systems using development and deployment of application programming interface code.

BACKGROUND

Existing systems require a user to navigate multiple systems, data stores, and procedural protocols in order to develop and integrate application programming interface (API) protocols for the integration of various system functions. In current systems, the development of a single API may require weeks of user-intensive programming and audit procedures in order to produce a workable final product. Furthermore, integration of API protocols within an entity system may be cumbersome in terms of inventorying cross functionality and actively deployed API protocols in order to provide secure and problem-free data access. As such, a need exists for an improved system for the development of APIs that provides a quick, user-friendly, and organized system for generating, accessing, and inventorying APIs across an entity system.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later. Embodiments of the present invention address these and/or other needs by providing a system for automating the development and implementation of API protocols via a user-friendly user interface (UI) dashboard that allows users to create new API protocols without intensive coding requirements. The system is configured to provide automatic data discovery, customized documentation with UI based management, and support for all major database types. The system is further configured to access one or more micro-services via a single UI. Furthermore, the system may deploy micro-services in an easily scalable and replaceable manner in order to source requested data and provide it across an entity system. The system is designed to provide a seamless front-end creation dashboard with token based authorization of user access which users may utilize to configure new APIs that are displayed across an entity system. The system includes inbuilt administration features, such as a separate user interface dashboard for system administrators to monitor the creation of and activity associated with active APIs across an entity system, such as tracking API calls and metadata in order to easily view the resource requirements and access activities associated with one or more APIs. The system is also configured for customized documentation of user activity and API activity within a UI based management interface that supports entity recommended error logging and handling practices and test-driven deployment procedures. In some instances, the system comprises: at least one memory device with computer-readable program code stored thereon, at least one communication device, at least one processing device operatively coupled to the at least one memory device and the at least one communication device, wherein executing the computer-readable program code is typically configured to cause the at least one processing device to perform, execute or implement one or more features or steps of the invention.

Embodiments of the invention relate to systems, computer implemented methods, and computer program products for rapid API configuration and deployment, the system comprising: at least one memory device with computer-readable program code stored thereon; at least one communication device; at least one processing device operatively coupled to the at least one memory device and the at least one communication device, wherein executing the computer-readable program code is configured to cause the at least one processing device to: provide an application to access an API configuration platform on a user device; receive a request, via the application on the user device, to onboard an active directory user; onboard the active directory user; receive a request to create a new API from the onboarded active directory user; transmit request for connection configuration information and data provider information to the onboarded active directory user via the application on the user device; establish a connection to a data provider based on the requested connection configuration and data provider information; transmit request for API details of the new API to the onboarded active directory user via the application on the user device; perform one-click API creation of the new API to generate a newly created API; and add the newly created API to an API access management dashboard.

In some embodiments, the application on the user device comprises a web-based application accessible remotely over a network connection.

In some embodiments, onboarding the active directory user further comprises requesting a two-step verification of the active directory user's credentials, and wherein the active directory user's access to one or more data providers is limited by the system based on the active directory user's credentials.

In some embodiments, the data provider information comprises a provider identification and a username of the active directory user.

In some embodiments, the connection configuration information comprises a name, description, host, database name, username of the active directory user, and a password for the active directory user.

In some embodiments, the access management dashboard comprises a list of one or more created APIs generated by the system.

In some embodiments, the system further comprises providing an administrator dashboard of analytical information for one or more APIs generated by the system, wherein the analytical information comprises a graphical depiction of call-count, average call-count, requests, or response time of the one or more APIs generated by the system over a selectable time period.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Having thus described embodiments of the invention in general terms, reference will now be made to the accompanying drawings, wherein:

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on."

In some embodiments, an "entity" or "enterprise" as used herein may be any institution or establishment, associated with a network connected resource transfer platform, and particularly geolocation systems and devices. As such, the entity may be any institution, group, association, financial institution, merchant, establishment, company, union, authority or the like.

As described herein, a "user" is an individual associated with an entity. As such, in some embodiments, the user may be an individual having past relationships, current relationships or potential future relationships with an entity. In some embodiments, a "user" may be an employee (e.g., an associate, a project manager, an IT specialist, a manager, an administrator, an internal operations analyst, or the like) of the entity or enterprises affiliated with the entity, capable of operating the systems described herein. In some embodiments, a "user" may be any individual, entity or system who has a relationship with the entity, such as a customer or a prospective customer. In other embodiments, a user may be a system performing one or more tasks described herein.

In the instances where the entity is a resource entity or a merchant, financial institution and the like, a user may be an individual or entity with one or more relationships, affiliations or accounts with the entity (for example, the merchant, the financial institution). In some embodiments, the user may be an entity or financial institution employee (e.g., an underwriter, a project manager, an IT specialist, a manager, an administrator, an internal operations analyst, bank teller or the like) capable of operating the system described herein. In some embodiments, a user may be any individual or entity who has a relationship with a customer of the entity or financial institution.

For purposes of this invention, the term "user" and "customer" may be used interchangeably. A "technology resource" or "account" may be the relationship that the user has with the entity. Examples of technology resources include a deposit account, such as a transactional account (e.g. a banking account), a savings account, an investment account, a money market account, a time deposit, a demand deposit, a pre-paid account, or the like. The technology resource or account is typically associated with and/or maintained by an entity, and is typically associated with technology infrastructure such that the resource or account may be accessed, modified or acted upon by the user electronically, for example using or transaction terminals, user devices, merchant systems, and the like. In some embodiments, the entity may provide one or more technology instruments or financial instruments to the user for executing resource transfer activities or financial transactions. In some embodiments, an entity may be any institution, group, association, club, establishment, company, union, authority or the like with which a user may have a relationship. As discussed, in some embodiments, the entity represents a vendor or a merchant with whom the user engages in financial (for example, resource transfers like purchases, payments, returns, enrolling in merchant accounts and the like) or non-financial transactions (for resource transfers associated with loyalty programs and the like), either online or in physical stores.

As used herein, a "user interface" may be a graphical user interface that facilitates communication using one or more communication mediums such as tactile communication (such, as communication via a touch screen, keyboard, and the like), audio communication, textual communication and/ or video communication (such as, gestures). Typically, a graphical user interface (GUI) of the present invention is a type of interface that allows users to interact with electronic elements/devices such as graphical icons and visual indicators such as secondary notation, as opposed to using only text via the command line. That said, the graphical user interfaces are typically configured for audio, visual and/or textual communication, and are configured to receive input and/or provide output using one or more user device components and/or external auxiliary/peripheral devices such as a display, a speaker, a microphone, a touch screen, a keypad, a mouse, and/or the like. In some embodiments, the graphical user interface may include both graphical elements and text elements. The graphical user interface is configured to be presented on one or more display devices associated with user devices, entity systems, auxiliary user devices, processing systems and the like. In some embodiments, the graphical user interface may be presented in a different configuration depending on the user or type of user that accesses it. In some embodiments, the graphical user interface may be a component of a web-based application that the user may access remotely over a network or a secure virtual private network, secure socket layer, and the like.

In accordance with embodiments of the invention, the term "user" may refer to a an authorized person, business or the like, who utilizes an external apparatus such as a user device, for accessing the rapid API development system. The external apparatus may be a user device (computing devices, mobile devices, smartphones, wearable devices, and the like). In some embodiments, the user may seek to perform one or more user activities using a web-based application accessed via the user device web browser or in some embodiments may perform one or more user activities using a locally stored application on the user device to interact with the rapid API development system of the invention. In some embodiments, the user may perform a query by initiating a request for information from the entity systems or various databases using the user device to interface with the rapid API development system to configure, test, deploy, and later utilize a custom API to perform data calls.

Figure 1:
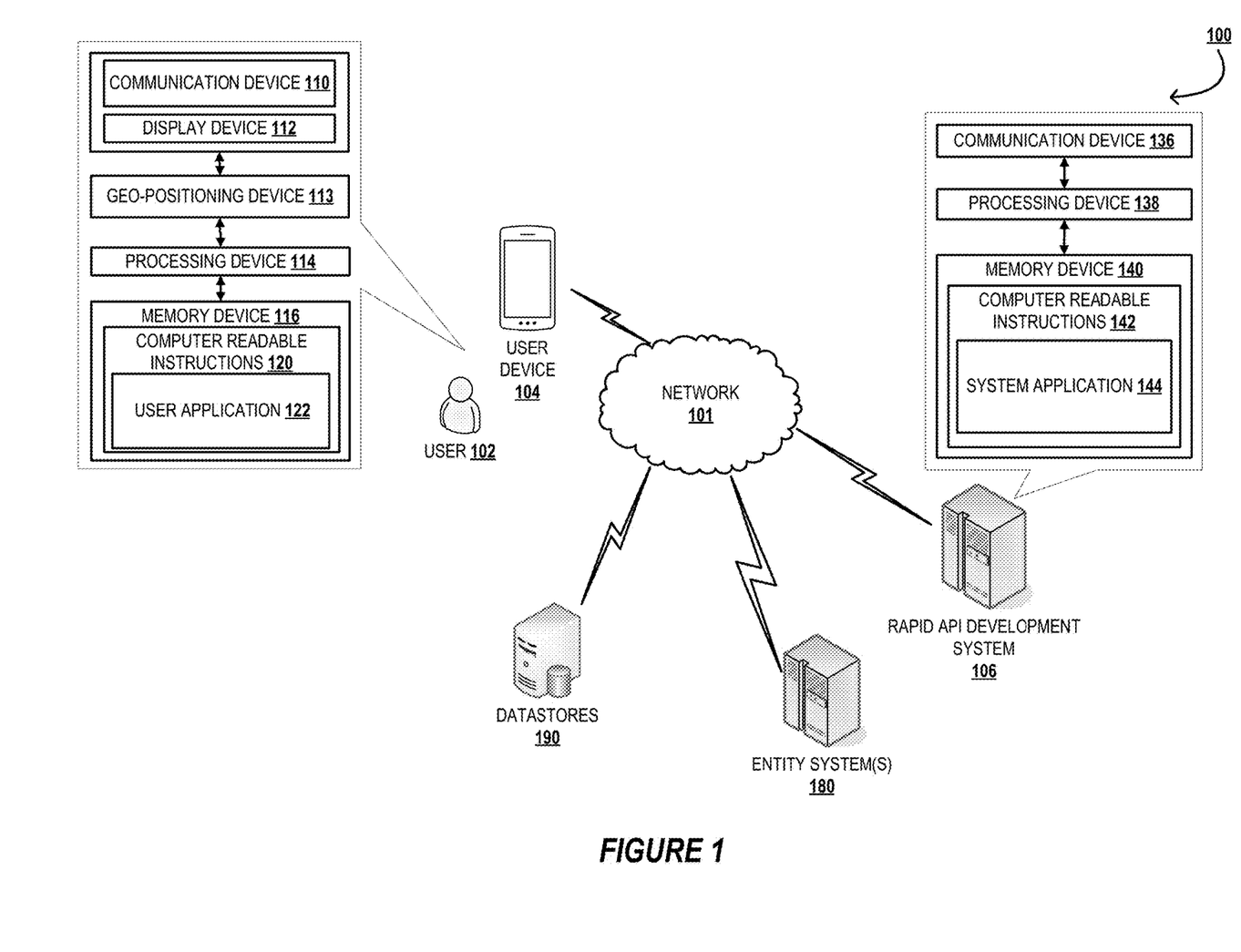
FIG. 1 depicts a platform environment 100 providing a system for rapid API development, in accordance with one embodiment of the present invention.

FIG. 1 depicts a platform environment 100 providing a system for rapid API development, in accordance with one embodiment of the present invention. As illustrated in FIG. 1, a rapid API development system 106, configured for providing an application or web application interface accessible by a user device 104. The rapid API development system 106 is operatively coupled, via a network 101 to one or more user devices 104, to entity systems 180, datastores 190, and other external systems/third-party servers not illustrated herein. In this way, the rapid API development system 106 can send information to and receive information from multiple user devices 104 to provide an integrated platform and data access to a user 102. At least a portion of the system is typically configured to reside on the user device 104 (for example, at the user application 122), on the rapid API development system 106 (for example, at the system application 144), and/or on other devices and systems such as the entity systems 180 and is a responsive system that facilitates execution of electronic activities and rapid development of APIs in an integrated manner.

The network 101 may be a global area network (GAN), such as the Internet, a wide area network (WAN), a local area network (LAN), or any other type of network or combination of networks. The network 101 may provide for wireline, wireless, or a combination wireline and wireless communication between devices on the network 101. In some embodiments, the user 102 is an individual that wishes to conduct one or more activities with rapid API development system 106 using the user device 104. In some embodiments, the user 102 may access the rapid API development system 106, and/or the entity system 180 through a user interface comprising a webpage or a user application. Hereinafter, "user application" is used to refer to an application on the user device 104 of the user 102, a widget, a webpage accessed through a browser, and the like. As such, in some instances, the user device may have multiple user applications stored/installed on the user device 104 and the memory device 116 in particular. In some embodiments, the user application is a user application 122, also referred to as a "user application" 122 herein, provided by and stored on the user device 104 by the rapid API development system 106. In some embodiments the user application 122 may refer to a third party application or a user application stored on a cloud used to access the rapid API development system 106 through the network 101. In some embodiments, the user application is stored on the memory device 140 of the rapid API development system 106, and the user interface is presented on a display device of the user device 104, while in other embodiments, the user application is stored on the user device 104.

The user 102 may subsequently navigate through the interface, perform one or more searches or initiate one or more activities or API developments or configurations using a central user interface provided by the user application 122 of the user device 104. In some embodiments, the user 102 may be routed to a particular destination using the user device 104. In some embodiments the user device 104 requests and/or receives additional information from the rapid API development system 106/the resource entity system 160 and/or the user device 104 for authenticating the user and/or the user device, determining appropriate queues, executing information queries, and other functions.

The user device 104, herein referring to one or more user devices, wherein each device may generally comprise a communication device 110, a display device 112, a geo-positioning device 113, a processing device 114, and a memory device 116. Typically, the user device 104 is a computing system that allows a user 102 to interact with other systems to initiate or to complete activities, resource transfers, and transactions for products, and the like. The processing device 114 is operatively coupled to the communication device 110 and the memory device 116. The processing device 114 uses the communication device 110 to communicate with the network 101 and other devices on the network 101, such as, but not limited to the entity system 180, datastores 190, and the rapid API development system 106. As such, the communication device 110 generally comprises a modem, server, or other device for communicating with other devices on the network 101. In some embodiments, the processing device 114 may be further coupled to a display device 112, a geo-positioning device 113, and/or a transmitter/receiver device, not indicated in FIG. 1. The display device 112 may comprise a screen, a speaker, a vibrating device or other devices configured to provide information to the user. In some embodiments, the display device 112 provides a presentation of the central user interface of the integrated user application 122. The geo-positioning device 113 may comprise global positioning system (GPS) devices, triangulation devices, accelerometers, and other devices configured to determine the current geographic location of the user device 104 with respect to satellites, transmitter/beacon devices, telecommunication towers and the like. In some embodiments the user device 104 may include authentication devices like fingerprint scanners, heart-rate monitors, microphones and the like that are configured to receive bio-metric authentication credentials from the user.

The user device 104 comprises computer-readable instructions 120 stored in the memory device 116, which in one embodiment includes the computer-readable instructions 120 of the user application 122. In this way, users 102 may authenticate themselves, initiate API developments, communicate with the rapid API development system 106 to request or transmit information, initiate an API call, and/or view analytics data using the central user interface of the user device 104. As discussed previously, the user device 104 may be, for example, a desktop personal computer, a mobile system, such as a cellular phone, smart phone, personal data assistant (PDA), laptop, wearable device, a smart TV, a smart speaker, a home automation hub, augmented/virtual reality devices, or the like. The computer readable instructions 120 such as computer readable/executable code of the user application 122, when executed by the processing device 114 are configured to cause the user device 104 and/or processing device 114 to perform one or more steps described in this disclosure, or to cause other systems/devices to perform one or more steps described herein.

As further illustrated in FIG. 1, the rapid API development system 106 generally comprises a communication device 136, at least one processing device 138, and a memory device 140. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 138 is operatively coupled to the communication device 136 and the memory device 140. The processing device 138 uses the communication device 136 to communicate with the network 101 and other devices on the network 101, such as, but not limited to the entity systems 180, datastores 190, and/or the user device 104. As such, the communication device 136 generally comprises a modem, server, wireless transmitters or other devices for communicating with devices on the network 101. The memory device 140 typically comprises a non-transitory computer readable storage medium, comprising computer readable/executable instructions/code, such as the computer-readable instructions 142, as described below.

As further illustrated in FIG. 1, the rapid API development system 106 comprises computer-readable instructions 142 or computer readable program code 142 stored in the memory device 140, which in one embodiment includes the computer-readable instructions 142 of a system application 144 (also referred to as a "system application" 144). The computer readable instructions 142, when executed by the processing device 138 are configured to cause the system 106/processing device 138 to perform one or more steps described in this disclosure to cause out systems/devices (such as the user device 104, the user application 122, and the like) to perform one or more steps described herein. In some embodiments, the memory device 140 includes a data storage for storing data related to user transactions and resource entity information, but not limited to data created and/or used by the system application 144. In the embodiment illustrated in FIG. 1, and described throughout much of this specification, a "system" configured for performing one or more steps described herein refers to the user application 122, that may perform one or more user activities either alone or in conjunction with the rapid API development system 106, and specifically, the system application 144, and the like.

Figure 2:
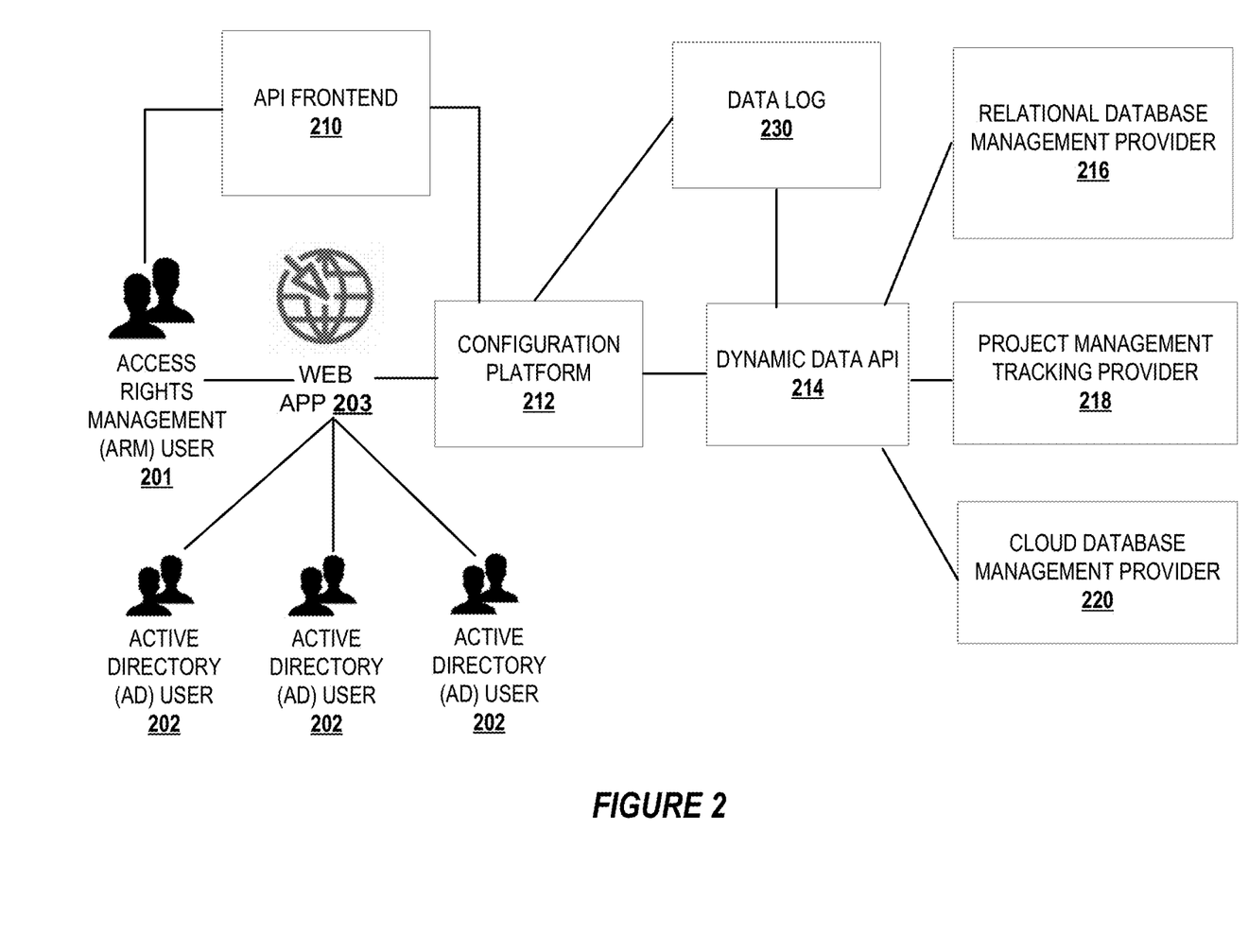
FIG. 2 depicts an architecture 200 for configuring and distributing APIs, in accordance with one embodiment of the present invention.

FIG. 2 depicts an architecture 200 for configuring and distributing APIs, in accordance with one embodiment of the present invention. As shown, the architecture 200 includes an API frontend 210 that interfaces with a configuration platform 212 in order to provide various users with access and configuration capabilities to the system for rapid API development. In the embodiment depicted in FIG. 2, one or more access rights management (ARM) users 201 have access to the API frontend 210 that allows for the on-boarding and management of one or more active directory (AD) users 202. While only a certain number of ARM users 201 and AD users 202 are shown in FIG. 2, it is understood that any number of either of these users may exist, but that generally the number of AD users 202 exceeds the number of ARM users 201. As shown in FIG. 2, AD users 202 may access the configuration platform 212 via web application (web app) 203. While the architecture embodiment in FIG. 2 only shows a single web app 203, it is understood that the web app 203 may coincide with or stand in place of user application 122, or system application 144, as discussed with regard to the system environment 100 in FIG. 100. As such the ARM user(s) 201 and AD users 202 may access the configuration platform 212 via the user devices 104 and rapid API development system 106.

As further depicted in FIG. 2, the configuration platform 212 is operatively connected to various data providers via dynamic data API 214. The dynamic data API 214 is designed to request and retrieve data from multiple different datastores 190, which include, but are not limited to, relational database management provider 216, project management tracking provider 218, and cloud database management provider 220. While only one relational database management provider 216, project management tracking provider 218, and cloud database management provider 220 are shown in FIG. 2, it is understood that multiple of these datastores or other data providers may be operatively connected to the rapid API development platform 106, and thus various APIs may be configured by AD users 102 to automatically retrieve data via the dynamic data API 214. It is also understood that various data formats of datastores 190 may be accessed by dynamic data API 214, which may store information related to any number of different project data, entity data, financial transaction data, marketing data, regulatory data, and the like.

Also shown in FIG. 2 is data log 230, which is operatively connected with configuration platform 212 and dynamic data API 214. The data log 230 is designed to be configured through the configuration platform 212 by ARM users 201 in order track and record activity data and metadata across the rapid API development system 106 as API activities are created and executed. Data collected on the data log 230 may then be used later to generate analytics output as further described and exemplified in FIG. 6. Also included in the data log 230 may be data associated with on-boarded or authorized AD users 202, which may be altered as new users are given access to the rapid API development system 106 or old users are purged or deleted from the system. In some embodiments, the data log 230 may include API success rate, API call rate, API configuration information (e.g. time, AD user, external programs, data providers, and the like associated with configured APIs), bandwidth use by API, aggregate bandwidth use, processing resource use, API response time, and the like.

Figure 3:
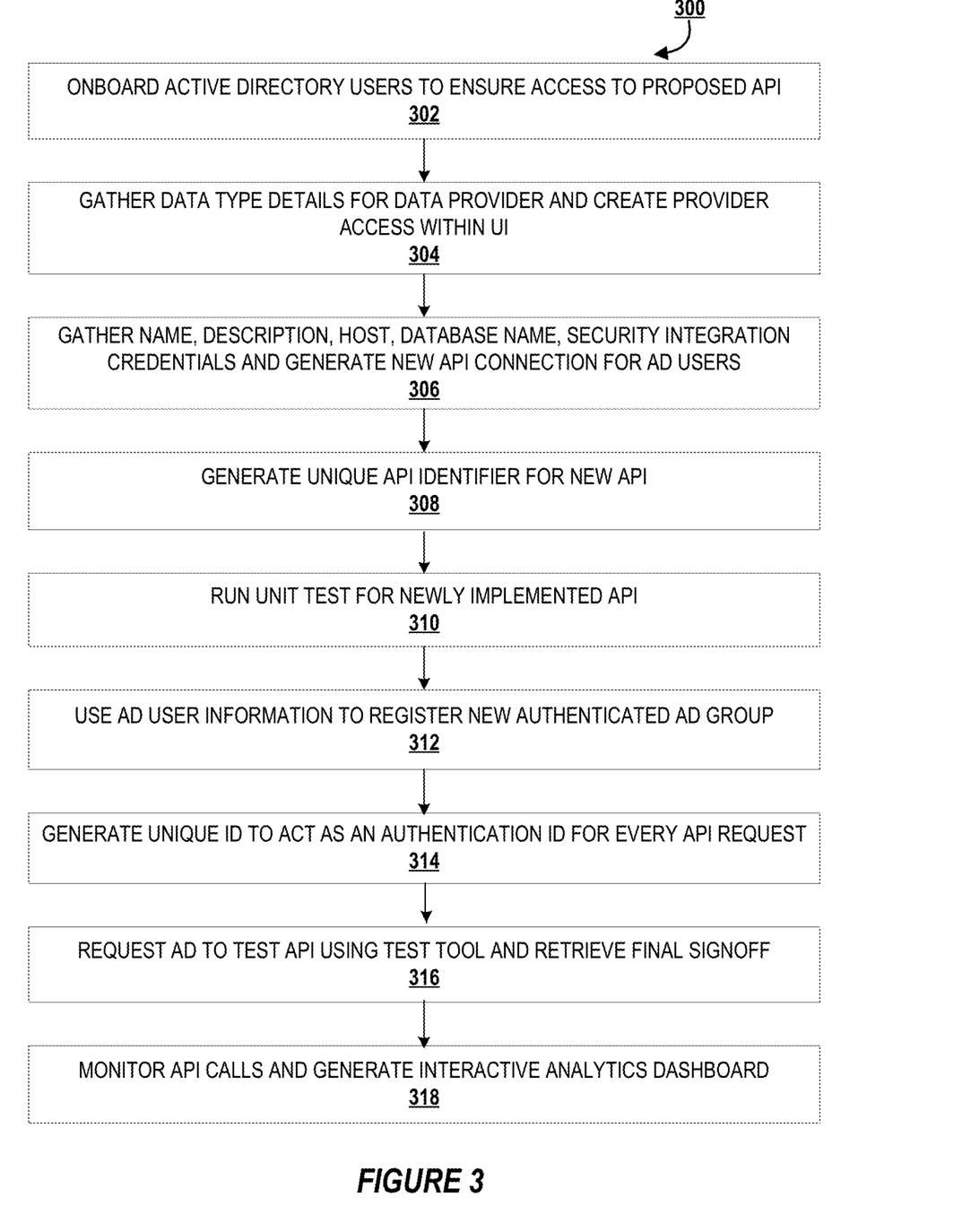
FIG. 3 depicts a high level process flow 300 for the creation, registration, and analysis of user groups, in accordance with one embodiment of the present invention.

FIG. 3 depicts a high level process flow 300 for the creation, registration, and analysis of user groups, in accordance with one embodiment of the present invention. As shown in FIG. 3, the process begins at block 302, wherein AD users 202 are onboarded to the rapid API development system 106 to provide access to these AD users 202 for API configuration and creation. The onboarding process may include creating an AD user preference for the AD users 202 that includes authentication information (e.g. three-step authentication information such as contact, QR code, or dynamic passcode information, and the like), user ID name, user access rights, and the like. In some embodiments, access to different types of data through the configuration of new APIs may be delineated such that AD users 202 are grouped into different categories. The gathering of such information and details about users is indicated in FIG. 3 at block 304. The AD users 202 may be categorized based on security clearance level, entity team or group, and the like such that the AD users 202 may only access data from providers that are relevant and for which they have proper security clearance, either as defined by the entity systems 180, datastores 190, or other regulations and policies. In some embodiments, the system may on-board AD users 202 that belong to a third party entity or organization, and may adjust data access and API configuration capabilities accordingly in order to ensure secure or limited data access rights.

As shown in block 306, once the name, description, host, database name, and security integration credentials are collected for new users, a new API connection through the rapid API development system 106 is created for AD users 202. The system then generates a unique API identifier for the new API, as shown in block 308, that the system uses to track API activity and maintain in the data log 230 as the new API is implemented. Next, a unit test is run for the newly implemented API to determine if the newly coded API contains any identifiable errors or coding problems, as shown in block 310, and AD user 202 information is used to register a newly authenticated AD user 202 group that can access the newly implemented API, as shown in block 312. The AD user 202 who created the newly implemented API is then requested to test the API using a test tool, and a final signoff is retrieved, as shown in block 316, indicating that the newly implemented API can successfully call data and is logged in the rapid API development system 106 for use by other AD users 202 and ARM users 201. Finally, the system monitors API calls and data received through the newly implemented API and generates an interactive analytics dashboard using data log 230, as shown in block 318.

Figure 4A:
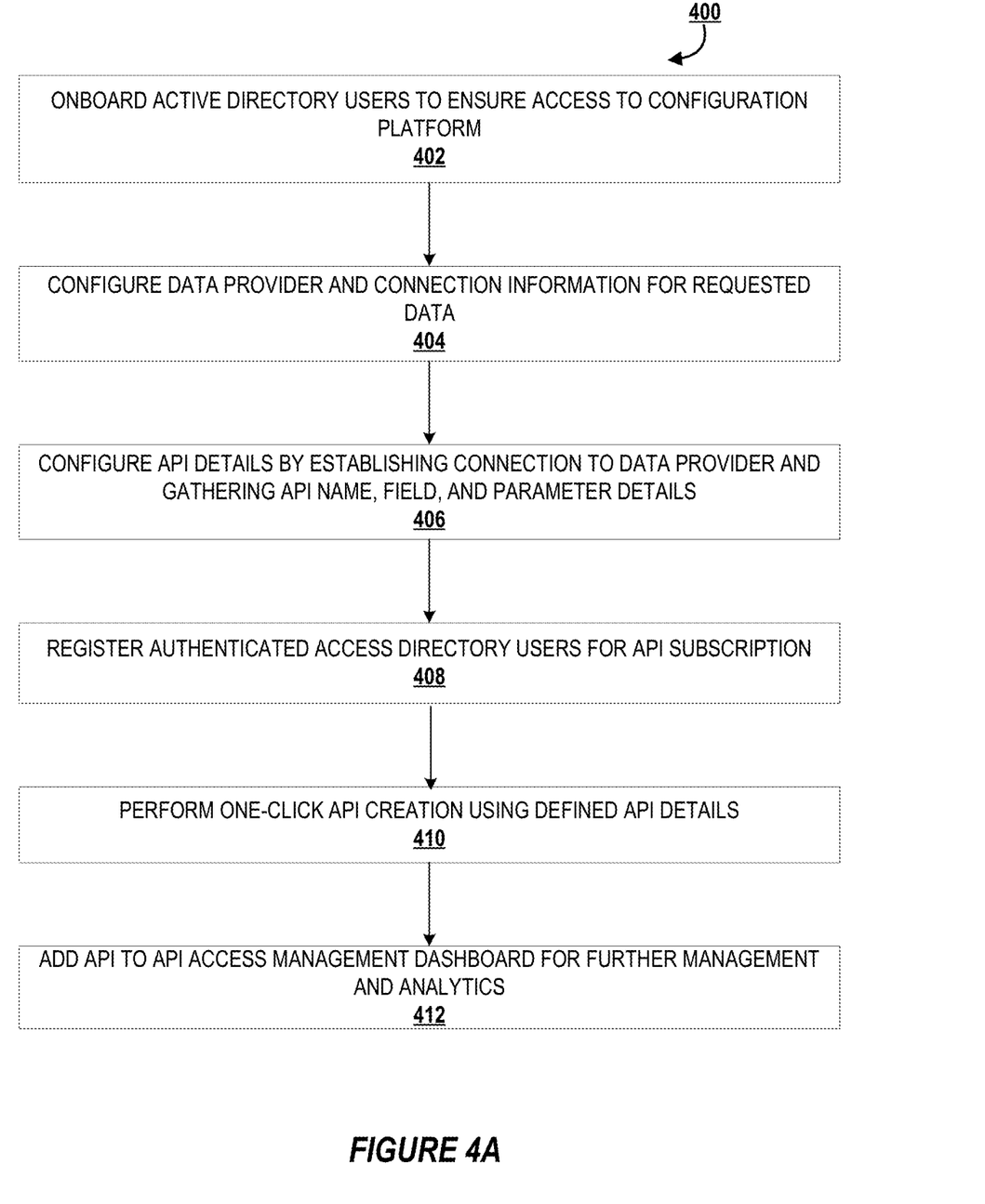
FIG. 4A depicts a high level process flow 400 for configuring an API, in accordance with one embodiment of the present invention.

FIG. 4A depicts a high level process flow 400 for configuring an API, in accordance with one embodiment of the present invention. As shown, the process in FIG. 4A begins at block 402, wherein AD users 202 are onboarded to the rapid API development system 106 to provide access to these AD users 202 for API configuration and creation. When the AD user 202 initiates the creation of the new API, the system may configure a data provider and request input for connection information for the data requested by the AD user 202, as shown in block 404. This allows the AD user 202 to configure the API by selecting the data that is most useful to the AD user 202, as opposed to requiring the AD user 202 to code and configure the data provider and connection information manually. Block 404 is an automated step achieved by the configuration platform 212 and dynamic data API 214. As shown in block 406, API details are also configured by establishing a connection to the appropriate data provider and gathering API name, field, and parameter details from the AD user 202. Next, authenticated AD users 202 are registered by the system for API subscription, giving a set of one or more AD users 202 access to the newly created API. Using the details supplied from the AD user 202 configuring the API and the automatically configured details generated by the system, the AD user 202 can then perform a one-click API creation, as shown in block 410. The API is then added to an API access management dashboard for further management and analytics activities that are accessible from the API frontend 210 or web app 203. The entire API creation process can be completed by a user within a matter of minutes, allowing the user to quickly and generate a new API with data retrieval capabilities from any selected data provider in a quick, simple, and reliable manner that requires no intensive coding background or proficiency with manual API coding.

Figure 4B:
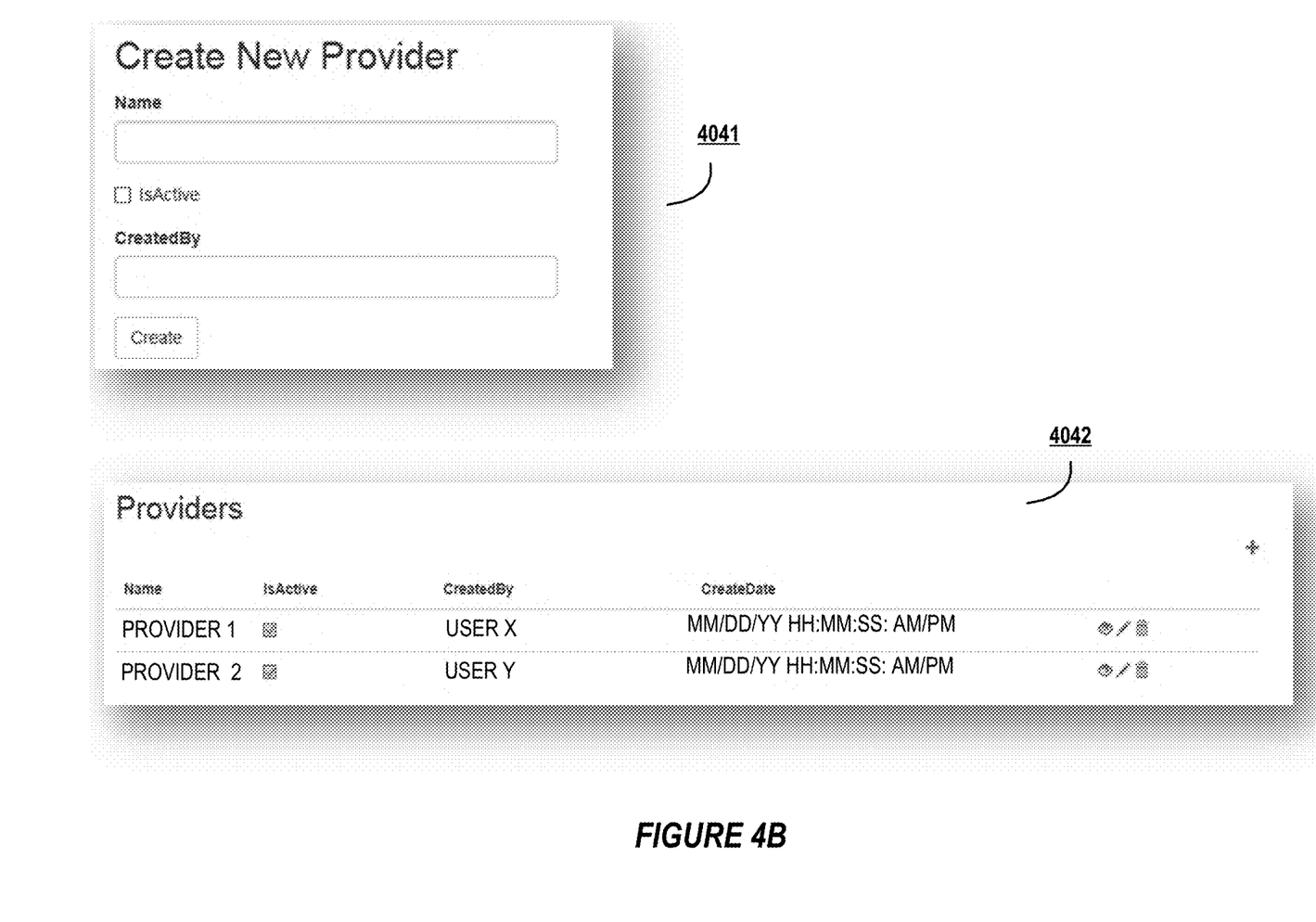
FIG. 4B depicts a user interface display for creation of a new provider, in accordance with one embodiment of the present invention.

FIG. 4B depicts a user interface display for creation of a new provider, in accordance with one embodiment of the present invention. As discussed with regard to FIG. 4A, block 404, when the AD user 202 initiates the creation of the new API, the system may configure a data provider and request input for connection information for the data requested by the AD user 202. Depicted in 4B are two embodiments of the user interface (UI) displayed to the user inputs such information regarding the data provider. It is understood that these are exemplary embodiments, and while the UI display may contain additional input fields, the embodiments shown in FIG. 4B are for illustrative purposes to show the nature of the UI in terms of its ease of use and minimal requirements for manual data input. As shown in interface 4041, the user may enter a name for the newly created data provider, as well as provide their AD user 202 identification in the "CreatedBy" input field. This data is saved in data log 230 and associated with the newly created provider in order to keep a record of the creator of the data provider. Additionally, the system may provide data connection selections based on the AD user 202 that is creating the new data provider. Next, as shown in interface 4042, the system may display a list of created providers along with information as to the time, date, and user who created the provider. To the right of this information are options to view more details (as indicated by the eye-shaped icon), edit the provider (as indicated by the pencil icon), and delete the provider (as indicated by the waste bin icon).

Figure 4C:
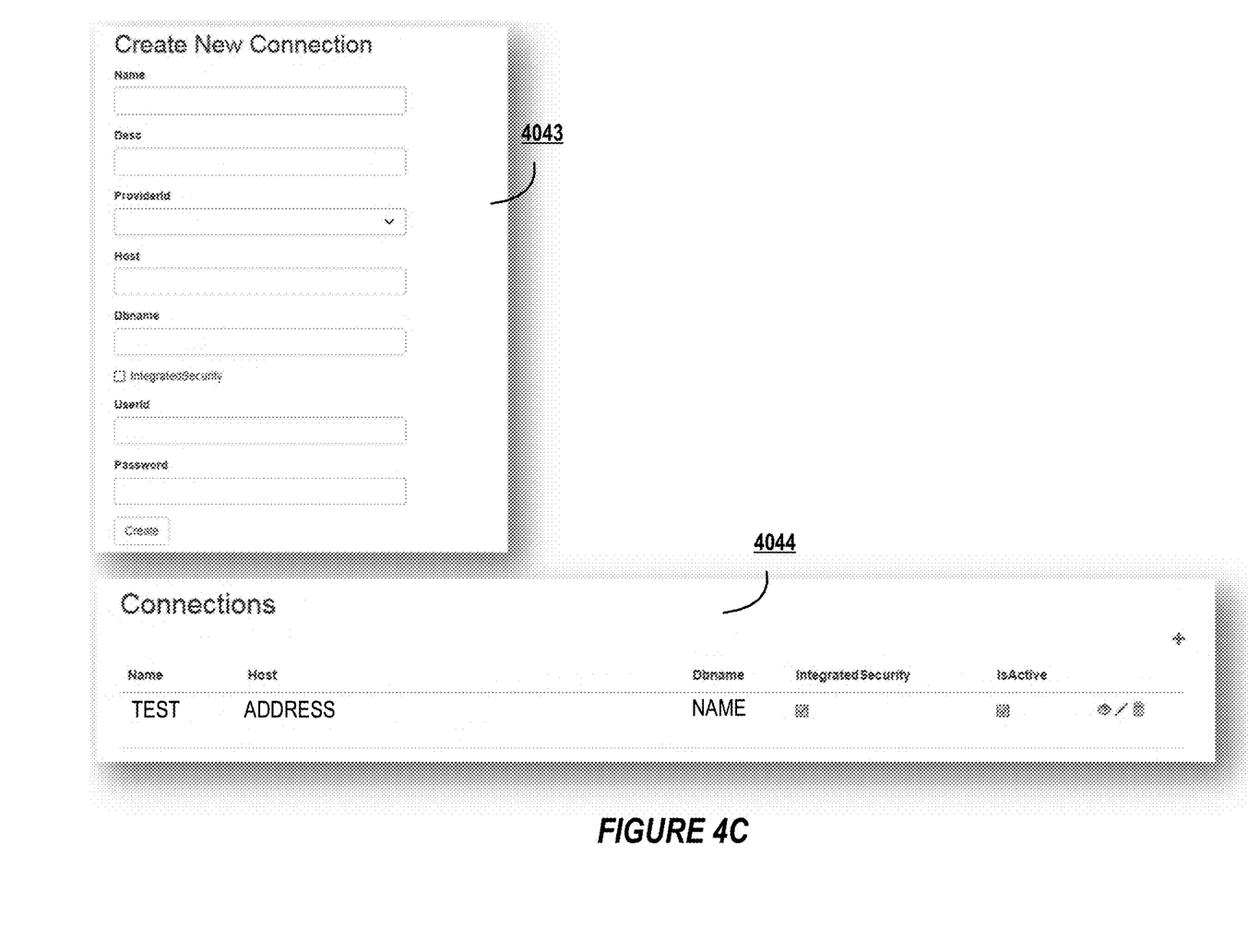
FIG. 4C depicts a user interface display for creation of a new connection, in accordance with one embodiment of the present invention.

FIG. 4C depicts a user interface display for creation of a new connection, in accordance with one embodiment of the present invention. As discussed with regard to FIG. 4A, block 404, when the AD user 202 initiates the creation of the new API, the system may configure a data provider and request input for connection information for the data requested by the AD user 202. Depicted in 4C are two embodiments of the UI displayed to the user inputs such information regarding the data connection. It is understood that these are exemplary embodiments, and while the UI display may contain additional input fields, the embodiments shown in FIG. 4C are for illustrative purposes to show the nature of the UI in terms of its ease of use and minimal requirements for manual data input. As shown in interface 4043, the user may enter a name for the connection of the newly created API, as well as provide a short description (as indicated by "desc"), their provider ID, host information, database name ("dbname"), user ID, and a password. At that point, the user may click "create" in order to create the new connection, where it will then be added to the list of connections shown at interface 4044. As shown at interface 4044, the connection list displays the name, host, database name, and indicates whether integrated security has been activated or if the connection is active at the current time. To the right of this information are options to view more details (as indicated by the eye-shaped icon), edit the connection (as indicated by the pencil icon), and delete the connection (as indicated by the waste bin icon).

Figure 4D:
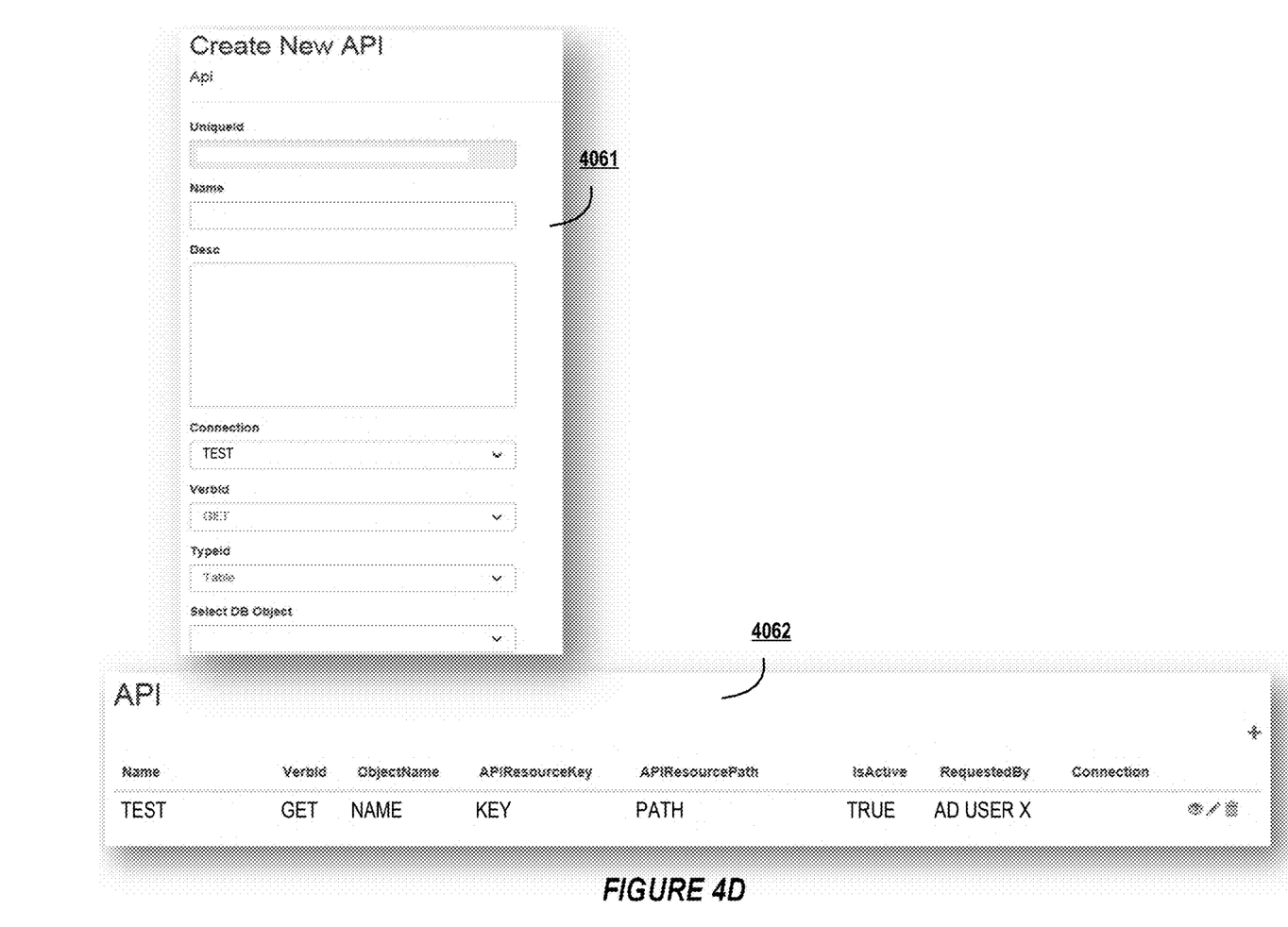
FIG. 4D depicts a user interface display for the gathering of newly created API details, in accordance with one embodiment of the present invention.

FIG. 4D depicts a user interface display for the gathering of newly created API details, in accordance with one embodiment of the present invention. As shown in block 406 of FIG. 4A, API details are also configured by establishing a connection to the appropriate data provider and gathering API name, field, and parameter details. Depicted in 4D are two embodiments of the UI displayed to the user inputs such information regarding the newly created API. It is understood that these are exemplary embodiments, and while the UI may contain additional input fields, the embodiments shown in FIG. 4D are for illustrative purposes to show the nature of the UI in terms of its ease of use and minimal requirements for manual data input. As shown, interface 4061 includes fields for API identification "unique ID," a descriptive name ("name"), a short description of the API ("desc"), and drop down menus for connection selection, call-action identification ("VerbId"), data type identification ("TypeId"), and database object ("select DB Object"). Once the details for the newly created API have been entered, interface 4062 will list the newly created API details in a list form, as shown by the corresponding details in the table of interface 4062. To the right of this information are options to view more details (as indicated by the eye-shaped icon), edit the newly created API details (as indicated by the pencil icon), and delete the newly created API (as indicated by the waste bin icon).

Figure 5:
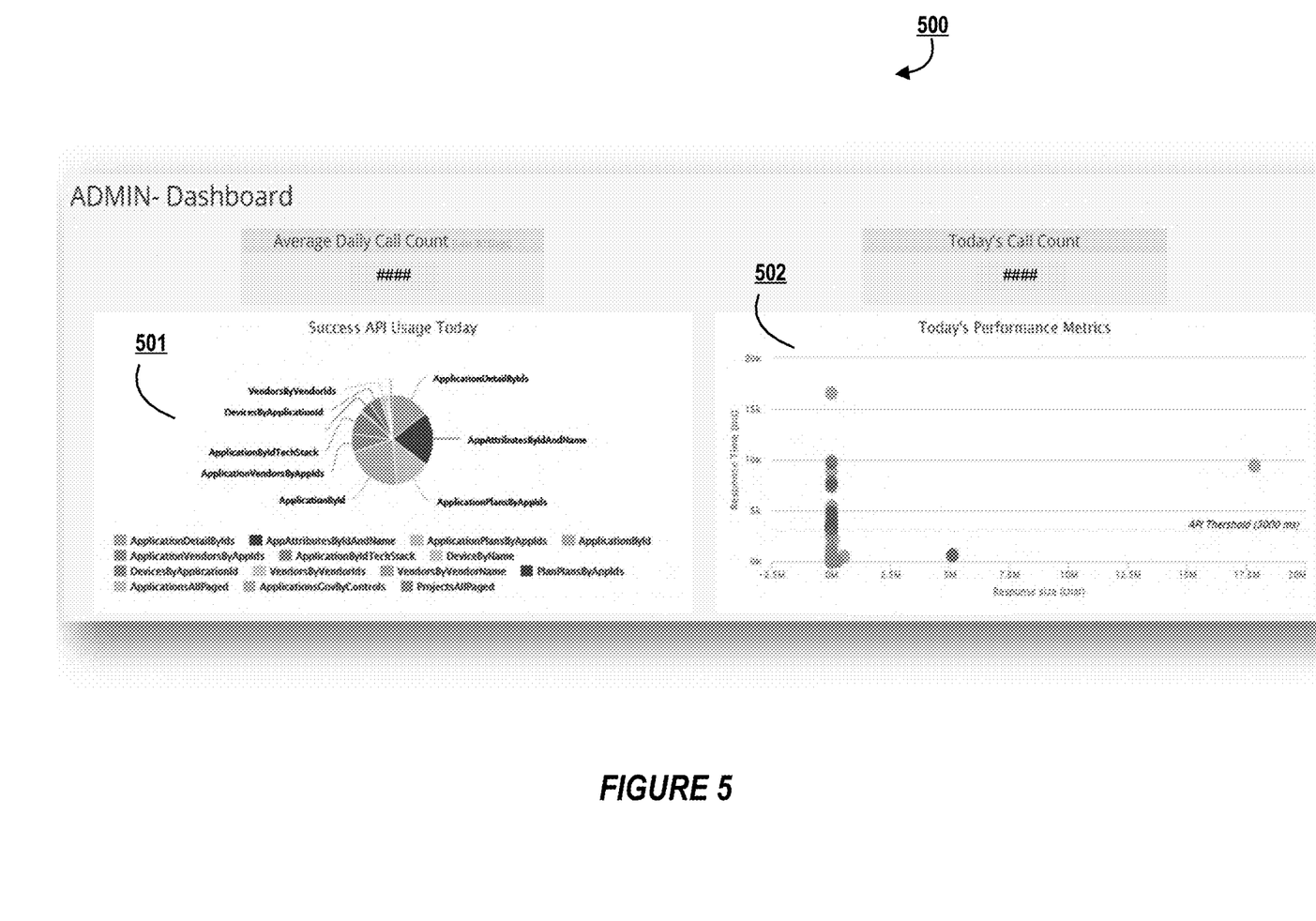
FIG. 5 depicts an administrator dashboard 500, in accordance with one embodiment of the present invention.

FIG. 5 depicts an administrator dashboard 500, in accordance with one embodiment of the present invention. In some embodiments, the admin dashboard 500 may be visible to only ARM users 201 via the web app 203 or API frontend 210, while in other embodiments, the admin dashboard 500 may be displayed to the AD users 202 via the web app 203. In embodiments where the AD users 202 are given access to the admin dashboard 500, the data displayed may be limited to the APIs for which specific AD users 202 have authorized access or have configured. In other embodiments, the data shown in the admin dashboard 500 may be dynamically altered for certain groups of AD users 202 to include anonymized data statistics for helpful comparison of the APIs they have configured as compared to other APIs. In still further embodiments, data for one or more APIs may be aggregated or averaged in order to show average statistics of API calls, access, response time, and data bandwidth over some time period. In some embodiments, the data displayed in the admin dashboard 500 may be updated in real time.

The administrator (admin) dashboard 500 may include analytical representation or display of any data or metadata from the data log 230 that is recorded and stored related to the data processed by or received by the system 106. As shown in the embodiment depicted in FIG. 5, the admin dashboard 500 may include data such as an average daily call count (shown on the left), or a total call count for a given day (as shown on the right under "today's call count"). It is understood that the data shown in the admin dashboard 500 may be presented in any number of graphical or numerical fashions, including tables, charts, graphs and the like. For instance, as shown in FIG. 5, the admin dashboard 500 shows an exemplary embodiments wherein active APIs on the rapid API development system 106 are charted according to average daily call count in the form of a pie chart 501. Alternatively, the admin dashboard 500 may depict data for a specific time period, as shown by "today's performance metrics," shown in graph 502 wherein API metrics are graphically depicted according to response size (as shown on the x-axis) and response time in milliseconds (as shown on the y-axis).

Figure 6:
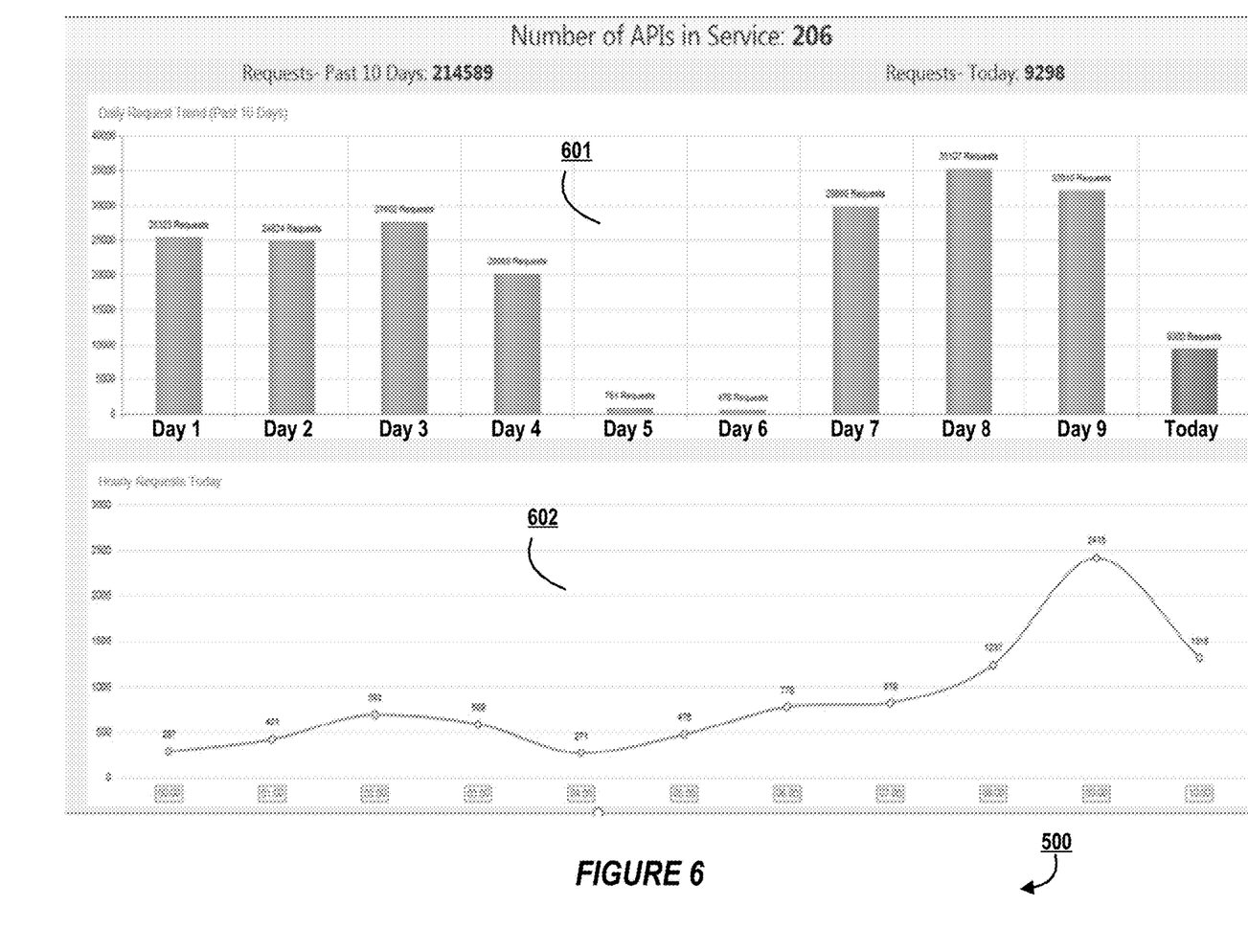
FIG. 6 depicts further information that may be shown in administrator dashboard 500, in accordance with one embodiment of the present invention.

FIG. 6 depicts further information that may be shown in administrator dashboard 500, in accordance with one embodiment of the present invention. It is understood that the capabilities and configurations discussed with respect to admin dashboard 500 in FIG. 5 apply to admin dashboard 500 with respect to FIG. 6 as well, but that FIG. 6 is provided to show additional data and analytical representations that may be shown by the rapid API development system 106. As shown in FIG. 6 the data shown on the admin dashboard 500 may include a generalized number of APIs in service, or requests received through such APIs (or any subgroup of APIs) over a given time period, such as the past 10 days (as depicted on the left), or one single day (as shown on the right as "requests—today"). The total requests received may be shown graphically as shown on graph 601, wherein the daily number of requests (as shown on the y-axis) is graphed for each consecutive day during a given period (as shown on the x-axis). In some embodiments, the admin dashboard 500 may include a graph such as graph 602, wherein number of API call requests (as shown on the y-axis) are graphed for each consecutive hour-long period (as shown on the x-axis) for a single day. It is understood that in some embodiments the graphical depictions shown in FIG. 5 and FIG. 6 may be customized by the users 102, such as ARM users 201 or AD users 202 and configured to display data for any given time period, group of APIs, group of users and the like. In further embodiments, the graphical depictions shown in FIG. 5 and FIG. 6 may be dynamically and automatically configured according to the user data associated with the user 102 accessing the admin dashboard 500.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, microcode, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions.

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A system for rapid API configuration and deployment, the system comprising:
   at least one memory device with computer-readable program code stored thereon;
   at least one communication device;
   at least one processing device operatively coupled to the at least one memory device and the at least one communication device, wherein executing the computer-readable program code is configured to cause the at least one processing device to:
   provide an application to access an API configuration platform on a user device;
   receive a request, via the application on the user device, to onboard an active directory user;
   onboard the active directory user, wherein onboarding the active directory user comprises verifying user credentials and access rights to create a preference for an onboarded active directory user;
   receive a request to create a new API from the onboarded active directory user;
   transmit a request for connection configuration information and data provider information to the onboarded active directory user via the application on the user device;
   establish a connection to a data provider based on the requested connection configuration and data provider information;
   transmit request for API details of the new API to the onboarded active directory user via the application on the user device;
   perform one-click API creation of the new API to generate a newly created API; and
   add the newly created API to an API access management dashboard.

2. The system of claim 1, wherein the application on the user device comprises a web-based application accessible remotely over a network connection.

3. The system of claim 1, wherein onboarding the active directory user further comprises requesting a two-step verification of the active directory user's credentials, and wherein the active directory user's access to one or more data providers is limited by the system based on the active directory user's credentials.

4. The system of claim 1, wherein the data provider information comprises a provider identification and a username of the active directory user.

5. The system of claim 1, wherein the connection configuration information comprises a name, description, host, database name, username of the active directory user, and a password for the active directory user.

6. The system of claim 1, wherein the API access management dashboard comprises a list of one or more created APIs generated by the system.

7. The system of claim 1, further comprising providing an administrator dashboard of analytical information for one or more APIs generated by the system, wherein the analytical information comprises a graphical depiction of call-count, average call-count, requests, or response time of the one or more APIs generated by the system over a selectable time period.

8. A computer program product for rapid API configuration and deployment, the computer program product comprising a non-transitory computer-readable storage medium having computer-executable instructions to:
   provide an application to access an API configuration platform on a user device;
   receive a request, via the application on the user device, to onboard an active directory user;
   onboard the active directory user, wherein onboarding the active directory user comprises verifying user credentials and access rights to create a preference for an onboarded active directory user;
   receive a request to create a new API from the onboarded active directory user;
   transmit a request for connection configuration information and data provider information to the onboarded active directory user via the application on the user device;

establish a connection to a data provider based on the requested connection configuration and data provider information;

transmit request for API details of the new API to the onboarded active directory user via the application on the user device;

perform one-click API creation of the new API to generate a newly created API; and add the newly created API to an API access management dashboard.

9. The computer program product of claim 8, wherein the application on the user device comprises a web-based application accessible remotely over a network connection.

10. The computer program product of claim 8, wherein onboarding the active directory user further comprises requesting a two-step verification of the active directory user's credentials, and wherein the active directory user's access to one or more data providers is limited by the system based on the active directory user's credentials.

11. The computer program product of claim 8, wherein the data provider information comprises a provider identification and a username of the active directory user.

12. The computer program product of claim 8, wherein the connection configuration information comprises a name, description, host, database name, username of the active directory user, and a password for the active directory user.

13. The computer program product of claim 8, wherein the API access management dashboard comprises a list of one or more created APIs generated by the system.

14. The computer program product of claim 8, further comprising providing an administrator dashboard of analytical information for one or more APIs generated by the system, wherein the analytical information comprises a graphical depiction of call-count, average call-count, requests, or response time of the one or more APIs generated by the system over a selectable time period.

15. A computer implemented method for establishing intelligent, proactive and responsive communication with a user, wherein the computer implemented method is configured to provide a multi-channel cognitive resource platform for performing electronic activities in an integrated manner from a single interface, the computer implemented method comprising:

an executable portion configured for providing an application to access an API configuration platform on a user device;

an executable portion configured for receiving a request, via the application on the user device, to onboard an active directory user;

an executable portion configured for onboarding the active directory user, wherein onboarding the active directory user comprises verifying user credentials and access rights to create a preference for an onboarded active directory user;

an executable portion configured for receiving a request to create a new API from the onboarded active directory user;

an executable portion configured for transmitting a request for connection configuration information and data provider information to the onboarded active directory user via the application on the user device;

an executable portion configured for establishing a connection to a data provider based on the requested connection configuration and data provider information;

an executable portion configured for transmitting request for API details of the new API to the onboarded active directory user via the application on the user device;

an executable portion configured for performing a one-click API creation of the new API to generate a newly created API; and an executable portion configured for adding the newly created API to an API access management dashboard.

16. The computer implemented method of claim 15, wherein the application on the user device comprises a web-based application accessible remotely over a network connection.

17. The computer implemented method of claim 15, wherein onboarding the active directory user further comprises requesting a two-step verification of the active directory user's credentials, and wherein the active directory user's access to one or more data providers is limited by the system based on the active directory user's credentials.

18. The computer implemented method of claim 15, wherein the data provider information comprises a provider identification and a username of the active directory user.

19. The computer implemented method of claim 15, wherein the connection configuration information comprises a name, description, host, database name, username of the active directory user, and a password for the active directory user.

20. The computer implemented method of claim 15, further comprising providing an administrator dashboard of analytical information for one or more APIs generated by the system, wherein the analytical information comprises a graphical depiction of call-count, average call-count, requests, or response time of the one or more APIs generated by the system over a selectable time period.

\* \* \* \* \*